March 29, 1966     W. H. GRISHAM     3,243,706
SATELLITE NET CONFIGURED FOR UNINTERRUPTED GLOBAL
COVERAGE AND DYNAMICALLY BALANCED TRACKING
Filed Oct. 5, 1961

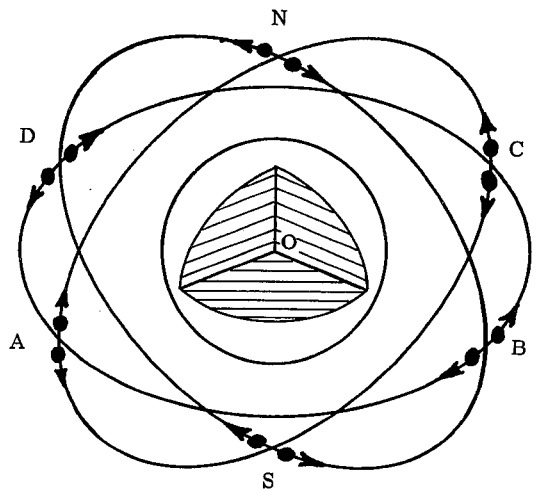

LEGEND

Earth Gravity Center:     O.

Polar Planes Intersection: N and S.

Polar and Equatorial Plane
Intersections: A, B, C, and D.

Polar Subsystem Orbit : N-A-S-C.

Polar Subsystem Orbit: N-D-S-B.

Equatorial Subsystem Orbit: A-B-C-D.

Satellites and Motion:

INVENTOR:     *William Howard Grisham*

United States Patent Office 3,243,706
Patented Mar. 29, 1966

3,243,706
SATELLITE NET CONFIGURED FOR UNINTERRUPTED GLOBAL COVERAGE AND DYNAMICALLY BALANCED TRACKING
William Howard Grisham, 109 N. Oceola Drive,
Eau Gallie, Fla.
Filed Oct. 5, 1961, Ser. No. 143,235
1 Claim. (Cl. 325—15)

The present invention relates generally to satellite configurations, and more particularly to satellite net configurations for uninterrupted global coverage and dynamically balanced tracking.

The present invention has the same general purpose as that described in my prior patent application Serial No. 128,308, filed July 25, 1961, now abandoned, and is a continuation in part of the latter. Three subsystems with four satellites are employed in each subsystem, all subsystems being mutually perpendicular, with two of the subsystems in polar planes 90° apart, and the remaining subsystem in the equatorial plane, and the angular velocity for all satellites is also five revolutions per sidereal day. However, in the present invention, all of the satellites counter-rotate in pairs.

It is an object of the present invention to provide an improved satellite system.

The above and still further objects, features and advantages of the present invention will become apparent upon consideration of the following detailed description of one specific embodiment thereof, especially when taken in conjunction with the accompanying drawing, wherein:

The single figure is a schematic diagram showing the arrangement paths of satellites according to the invention.

The improvement to be gained in the use of the present invention is due to the complete balance of the system. In the system of my prior application only the two "long haul" satellites are always in view of all of the other satellites in the array, except the opposite "long haul" satellite, but in the present invention all of the satellites have this very desirable feature. Therefore an improvement in trans-world communications can be realized through the use of the present invention.

The long haul satellites of the previous system are also the only two which could use the natural gravity gradient attitude control feature as well as the satellite to satellite beam point feature with a minimum complexity and energy. But all of the satellites of the present system have this feature, which should double the expected reliable "life" of the satellites, as well as decrease the weight of every satellite in half. This occurs since the required motion of the satellite to satellite beams must counter-rotate due to the counter-rotation of the receiving satellites in the pattern. Then, since a counter-rotating mechanism will not change the vehicle angular momentum, the beam mechanism's motion will not disturb the vehicle's attitude. To obtain this benefit, it is of course necessary to counter-rotate all of the satellites. Therefore the least possible energy is needed to maintain attitude. Also, since the beam pointing action is oscillatory in pendulum fashion, simple means could store the energy at the peak of each oscillation and return this energy to the system (less friction losses). The overall effect is to greatly reduce the complexity, weight and control energy needed to restore only friction losses. In the previous system ten of the satellites cannot use this feature, and constant attitude gas jet expenditure is necessary to meet the angular momentum change encountered during the unbalanced beam pointing mechanism movement which is inherent in the unbalanced pattern.

The other advantages of the previous system will still apply to the present system. A collision is easier to avoid since there will be only double meetings, i.e., there will never be a triple meeting. The attitude, earth area covered, minimum elevation angle is the "worst case," use of a single master control site at the equator with its advantages of a zenith pass, a 90° "look," etc., are the same in both systems. The need to launch two of the equatorial satellites west for the present system will not decrease its advantage. Although these two satellites would require a higher characteristic velocity, the actual booster could be smaller than an equivalent booster in the previous system since the satellite weight can be reduced as described above.

In addition, ground antennae tracking long haul satellites of the previous system do not have a meeting satellite replacement when the long haul satellite is setting. In the present system, all of the setting satellites are met with rising satellites to assure un-interrupted communications.

The single figure shows the present system shortly after a meeting has occurred. Meetings occur twenty times a sidereal day (nominally), or once every 72 minutes of time (approximately).

All four of the satellites in each of the three subsystems are nominally co-planar. All three of the subsystems are nominally orthogonal, and have two plane intersections at the poles, and four plane intersections on the equatorial plane.

The polar subsystems are phased as in the previous system, alternately meeting at the poles and the equatorial plane such that when one polar subsystem meets at the poles, the other meets at the equator.

The equatorial subsystem meets so as to cover the polar plane and equatorial plane intersection of the polar subsystem which is then meeting at the poles.

In short, at every meeting time, two satellites will meet at each of the six intersections of the three subsystem planes. As can be seen the balance will be perfect if this occurs.

All orbits are nominally circular, and subsystem orbits are nominally co-planar, but slight inclination differences, epoch errors, node crossing errors and eccentricities are expected from the nominal configuration described.

The present system is a system of twelve satellites all moving in natural earth orbits under natural perturbations. All satellites will be moving at an angular velocity of five revolutions per sidereal day, within tolerances set below. These twelve satellites are divided into three subsystems with four satellites per subsystem.

The orbits are all nominally circular, but an orbit altitude within twenty percent of that altitude which corresponds to a circular orbit with an orbital angular velocity of five revolutions per sidereal day is acceptable since some eccentricity can be tolerated. An orbital angular velocity deviation of 1% from the desired five revolutions per sidereal day will be the tolerance limit set.

The satellites in each of the four orbital planes within each subsystem are nominally co-planar, but a maximum angular deviation of plus or minus three degrees, between any two orbital planes in a subsystem, will be acceptable. The median plane of the subsystem is considered to be the subsystem plane hereinafter.

The planes of two of the subsystems are nominally inclined at 90° to the equatorial plane, but an inclination of 87° to 90° is acceptable; these two subsystems are hereinafter called polar subsystems. The remaining subsystem is nominally inclined at 0°, but an inclination of up to 3° is acceptable; this subsystem is hereinafter called the equatorial subsystem.

The line of nodes distribution of the polar subsystems at the equatorial plane is nominally 90° between the two subsystems, but a distribution of 87° to 93° between equatorial node crossings is acceptable.

Each polar subsystem will have its four satellites distributed as follows: two of the satellites will rotate in one sense while the other two satellites rotate in the opposite sense. Each pair of satellites rotating in the same sense will be nominally 180° apart in central angle, but a tolerance of +3° is acceptable. Therefore, satellites rotating in the opposite sense will "meet" (point of closest approach) in pairs at opposite sides of the celestial sphere once every 90° of central angle travel (if spacing is nominal). The system will be synchronized to assure that "meetings" occur at 0° or 90° latitude on the celestial sphere (within a tolerance of ±3° of these latitudes). The meetings will be further phased so that when one polar subsystem is "meeting" at the celestial poles, the other polar subsystem is "meeting" at the celestial equator (within the above tolerance of ±3°).

The subsystems four satellites will be distributed as follows: two of the satellites will rotate in one sense while the other two satellites rotate in the opposite sense. Each pair of satellites rotating in the same sense will be nominally 180° apart in central angle, but a tolerance of ±3° is acceptable. Therefore, satellites rotating in the opposite sense will "meet" in pairs on opposite sides of the celestial equator once every 90° of central angle travel (if spacing is nominal). The equatorial subsystem "meetings" will always occur within 3° central angle of the polar plane of the polar subsystem then "meeting" at the poles.

The twelve satellites are shown in the figure (not to scale) shortly after a "meeting." A pair of satellites "meets" at each of the six plane intersections on the celestial sphere at the same time if all conditions are ideal.

While I have described and illustrated one specific embodiment of my invention, it will be clear that variations of the details of construction which are specifically illustrated and described may be resorted to without departing from the true spirit and scope of the invention as defined in the appended claim.

I claim:

The method of satellite operation, which comprises the steps of:

(a) orbiting at equal angular velocities twelve satellites in three substantially orthogonal substantially orbital planes, a first four of said satellites being on one of said planes, a second four of said satellites being in a second of said planes, a third four of said satellites being in a third of said planes, two of said planes being substantially polar and one of said planes being substantially equatorial, said angular velocities being approximately five times the angular velocity of the earth, the four satellites in each of said orbits comprising two pairs of satellites, each of said pairs rotating in opposite senses and the individual satellites of each of said pairs being separated by one hundred and eighty degrees of central angle, (b) phasing satellites of each of said first four, said second four and said third four of said satellites to pass in close proximity once every 90° of central angle travel, such that the satellites pass in said close proximity at each of six points which are 90° apart on the celestial sphere, said six points being defined as the intersection on the celestial sphere surface by the three orthogonal lines formed by the intersections of said three orthogonal orbital planes, and such that only two of said satellites pass in close proximity at each of said six points at any one time.

References Cited by the Examiner
UNITED STATES PATENTS

| | | | |
|---|---|---|---|
| 3,144,606 | 8/1964 | Adams et al. | 325—4 |
| 3,163,820 | 12/1964 | Hight | 325—4 |

OTHER REFERENCES

Pierce et al.: Proc. I.R.E., vol. 47, No. 3, March 1959, pp. 372–380.

DAVID G. REDINBAUGH, *Primary Examiner.*

CURTIS L. JUSTUS, *Examiner.*

A. E. HALL, J. W. CALDWELL, *Assistant Examiners.*